United States Patent [19]

Dor

[11] Patent Number: 5,307,204
[45] Date of Patent: Apr. 26, 1994

[54] DUAL MOUNTING ASSEMBLY FOR NIGHT VISION SYSTEM

[75] Inventor: Amotz Dor, Scottsdale, Ariz.

[73] Assignee: Litton Systems, Inc., Beverly Hills, Calif.

[21] Appl. No.: 896,684

[22] Filed: Jun. 10, 1992

Related U.S. Application Data

[63] Continuation-in-part of Ser. No. 805,187, Dec. 10, 1991.

[51] Int. Cl.$^5$ .................. G02B 27/00; H01J 40/14
[52] U.S. Cl. .................. 359/400; 359/896; 359/480; 250/214 VT; 2/426
[58] Field of Search .................. 250/214 LA, 214 VT, 250/330; 359/400, 409, 412, 415, 417, 480, 896; 2/10, 6, 426, 427, 428, 429, 430, 453

[56] References Cited

U.S. PATENT DOCUMENTS

| | | | |
|---|---|---|---|
| 3,971,933 | 7/1976 | Adamson, Jr. | 250/214 VT |
| 4,132,889 | 1/1979 | Groenseweg | 250/214 VT |
| 4,463,252 | 7/1984 | Brennan et al. | 250/213 |
| 4,468,101 | 8/1984 | Ellis | 359/409 |
| 4,672,194 | 6/1987 | Kastendieck et al. | 250/214 VT |
| 4,697,783 | 10/1987 | Kastendieck et al. | 250/214 VT |
| 4,703,879 | 11/1987 | Kastendieck et al. | 359/477 |
| 5,184,231 | 3/1993 | Ellis | 359/13 |

OTHER PUBLICATIONS

Eyes in the Dark, Night Vision in a New Light; ICA, Jul. 1989.

Primary Examiner—Loha Ben
Assistant Examiner—D. Collins
Attorney, Agent, or Firm—Poms, Smith, Lande & Rose

[57] ABSTRACT

A mounting assembly for a night vision system is provided which allows the night vision system to be easily and rapidly switched from one eye to the next. The night vision system has an optical portion, and a control housing affixed to the optical portion. The control housing has a first and a second mounting plate. The mounting assembly has a first and a second carriage, and each of the carriages are configured to receive a selected one of the mounting plates. The mounting assembly can then be secured to either a face mask worn by the operator, or a helmet worn by the operator. The position of the carriages can be adjusted to compensate for the inter-pupillary distance and elevation relative a normal line of sight of an operator's eyes. The carriages are carried by a threaded rod having two portions threaded in opposite directions, so that rotation of the knob moves the carriages either closer together or further apart, as desired. The carriages also pivot against a pivot rod to selectively alter the carriage's elevation.

29 Claims, 7 Drawing Sheets

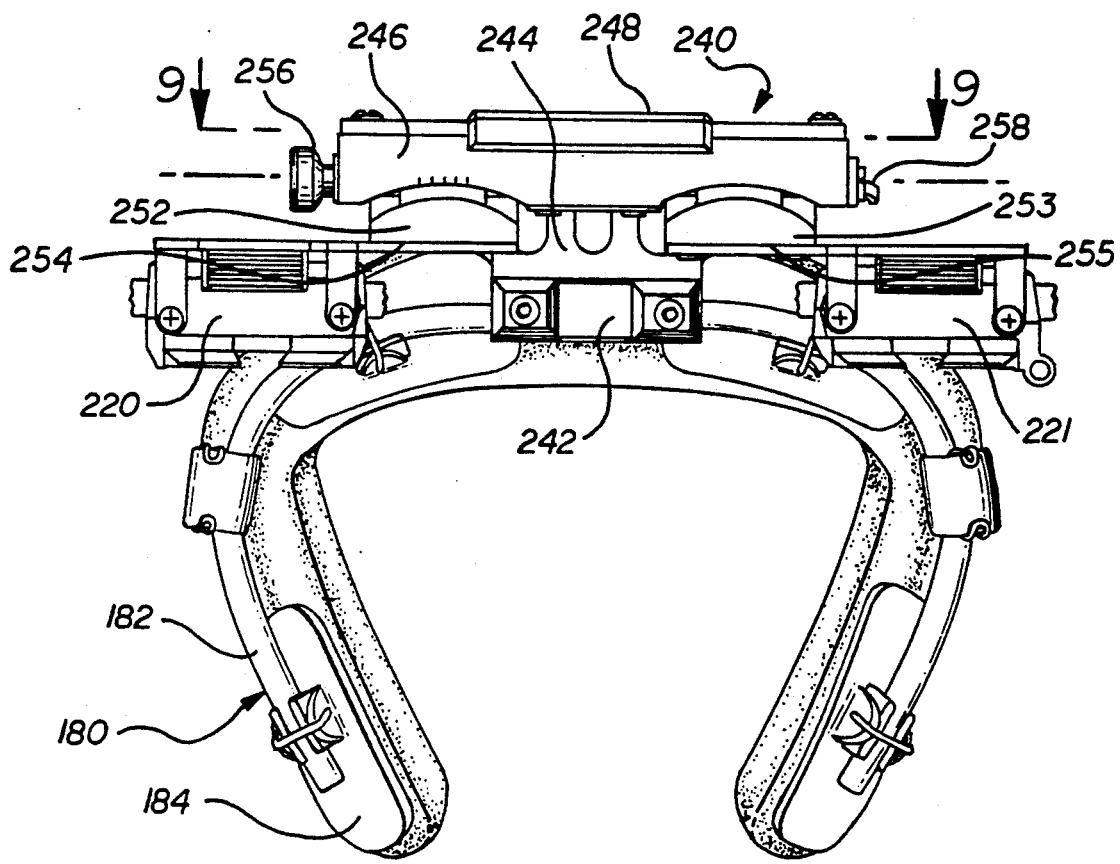
FIG. 8
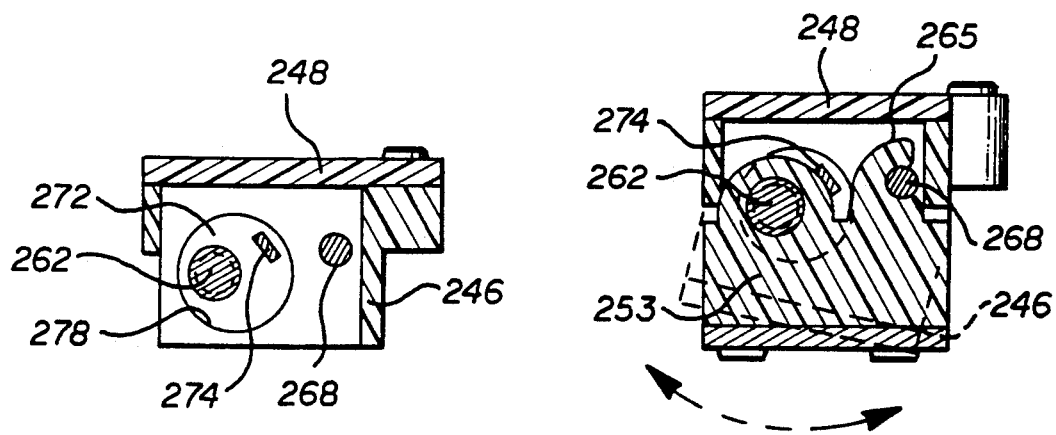
FIG. 10
FIG. 11

DUAL MOUNTING ASSEMBLY FOR NIGHT VISION SYSTEM

RELATED APPLICATIONS

The present invention is a continuation-in-part of the following co-pending patent application: Improved Night Vision System And Mounting Assembly, Ser. No. 07/805,187, filed Dec. 10, 1991, by Dor.

BACKGROUND OF THE INVENTION

1. Field of the Invention

The present invention relates to a night vision system, and more particularly to a dual mounting assembly for a night vision system usable in either a helmet-mounted or a face mask-mounted configuration.

2. Description of Related Art

Night vision systems are commonly used by military and law enforcement personnel for conducting operations in low light or night conditions. Night vision systems are also used to assist pilots of helicopters or airplanes in flying at night. Such night vision systems either take the form of binoculars, having separate eyepieces for each eye, or monoculars, having only a single eyepiece.

A night vision system intensifies the ambient light to produce an image. These systems require some residual light, such as moonlight or starlight, in which to operate. The ambient light is intensified by the night vision system to produce an output image which is visible to the human eye. The present generation of night vision systems utilize image intensification technologies to intensify the low level of visible light and also make visible the light from the infrared spectrum. The image intensification process involves conversion of the received ambient light into electron patterns and projection of the electron patterns onto a phosphor screen for conversion of the electron patterns into light visible to the observer. This visible light is then viewed by the operator through a lens provided in the eyepiece of the system.

It is common for operators of night vision systems to desire hands-free operation, in which binocular or monocular systems can be mounted to a mask worn on the operator's face. The typical face mask mounting assembly comprises a bar or rod having a plurality of cushion plates attached thereto. The bar would partially encircle the operator's face, and the cushion plates would press against specific points on the face, such as the cheeks and the forehead. The bar is held to the face by use of a strap which wraps around the head and connects to the bar at two places. At the center of the forehead portion of the bar, a mount is provided which would engage the binocular or monocular system.

Face mask mounting is not always desirable, since the mask interferes with the wearing of a helmet. If an operator intends to wear a standard ballistic helmet, the mask must be first adjusted to the operator's face prior to putting the helmet on. The operator first adjusts the mask for alignment of the night vision system with the eyes and then tightens the mask so that it remains in the adjusted position. When the helmet is put on the operator's head, the bulk and weight of the helmet frequently interferes with the upper portion of the face mask. This forces the mask downward relative the operator's face, knocking the night vision system out of alignment with the operator's eyes. The operator must then readjust the mask to accommodate the weight and bulk of the helmet. Alternatively, the operator can readjust the helmet so that it rides higher on the head, and does not interfere with the mask. However, this usage of the helmet is dangerous for the operator, since it removes the temples, forehead and back of the head from protection by the helmet.

If the operator is wearing a monocular system, it is often necessary to switch the monocular from eye to eye. To accommodate this, one type of prior art mounting assembly utilizes a pivoting system in which the monocular is pivoted from the left eye position to the right eye position. A significant problem with this configuration is that it is time-consuming to move the monocular from one eye to the next. The monocular must be readjusted in the new position to accommodate the precise position of the operator's eye. The distance between an operator's eyes, known as the inter-pupillary distance (IPD), varies with each person. In addition, the angle formed between the operator's head and the normal line of sight of the operator's eyes, known as elevation, also tends to vary slightly with each person. Both of these dimensions must be carefully adjusted so that the operator can comfortably use the monocular system. While the time required to make the configuration change and adjustment may be slight, it could mean the difference between life and death of an operator.

Monoculars which attach to center located mounting assemblies have the additional problem of interfering with the operator's use of the unaided eye. For example, it is increasingly common for operators to use externally mounted night vision monoculars, such as provided on a weapon, in addition to the face mask mounted monocular. The operator would typically use the face mask mounted monocular for one eye, and the weapon mounted monocular for the second or unaided eye. In this configuration, a high power, or telescopic lens would typically be used on the weapon, and a unitary power lens used on the face mask mounted system. If the center mounted night vision monocular obstructs too large a portion of the operator's face, or extends too far in the direction of the unaided eye, the operator would be unable to use the weapon mounted monocular.

Another type of prior art mounting assembly avoids using a center mounting assembly by providing a horizontal bar mounted to the front of a face mask above the operator's eyes, to which a night vision monocular is attached. A locking screw holds the monocular in a position on the bar. The operator slides the monocular along the bar to move it from proximity with one eye to the second eye. This presents the same problem to the operator as experienced with the pivoting center mount, since each time the position of the monocular is changed, the operator must recalibrate the new position with his eye's IPD and elevation to effectively use the monocular.

Another problem with each of these mounting assemblies is that they can typically accommodate only the use of an individual type of night vision system. If an operator is utilizing a monocular system with a single eye, and wishes to change to dual eye or binocular usage, the operator must remove the monocular system and replace it with a binocular type system. It would not be possible to use two monocular systems simultaneously since there is only a single mounting assembly. As described above, replacement of a first type with a second type would generally require a readjustment of the mounting assembly for alignment of the replacement night vision system with the operator's eyes. It also requires the operator to have available both a binocular and a monocular night vision system.

An additional problem experienced by operators of night vision systems is the temporary storage of the night vision system when it is not in use. When removed from the mounting assembly, it is common for night vision monoculars or binoculars to be either stowed in a pocket or pouch, or suspended from a lanyard which hangs from the operator's neck. However, certain circumstances render it difficult for an operator to quickly locate the device and install it in its operational position on the mounting assembly. For example, if the operator is in a crouched or reclined position, such as during reconnaissance, the operator may not be able to retrieve the device without altering the position or making unnecessary or extraneous movements. Moreover, since a soldier's available storage space is so limited, it would be advantageous to provide alternative stowing methods for such night vision equipment.

Thus, it would be desirable to provide a night vision system which could be easily and rapidly switched between an operator's eyes. It would be further desirable to provide a mounting assembly for a binocular or monocular to be used in conjunction with either the wearing of a helmet, or in association with a face mask. It would also be desirable to provide a mounting assembly for a night vision monocular which enables rapid and accurate readjustment to accommodate an operator's individual IPD and elevation. It would also be desirable to provide a mounting assembly for a night vision monocular which leaves sufficient clearance for the simultaneous use of an externally provided night vision monocular with the unaided eye. It would also be desirable to provide a mounting assembly for a night vision system enabling the simultaneous usage of two monocular systems to simulate a binocular effect. It would also be desirable to provide a mounting assembly for a night vision system which enables the monocular to be temporarily stored when not in use.

SUMMARY OF THE INVENTION

Accordingly, a principal object of the present invention is to provide a mounting assembly for a night vision system which allows the night vision system to be easily and rapidly switched from one eye to the next.

Another object of the present invention is to provide a mounting assembly for a night vision system which can be used in conjunction with either a helmet, or a face mask.

Another object of the present invention is to provide a mounting assembly for a night vision system which enables rapid and accurate readjustment to accommodate an operator's individual IPD and elevation.

Another object of the invention is to provide a mounting assembly for a night vision system which leaves sufficient clearance for the simultaneous use of an externally provided night vision system for the unaided eye.

Still another object of the invention is to provide a mounting assembly for a night vision system enabling the simultaneous usage of two monocular systems to simulate a binocular effect.

Yet another object of the invention is to provide a mounting assembly for a night vision system which enables a night vision monocular to be shifted to a non-operational position providing the operator with an unobstructed view during daylight usage.

To achieve the foregoing objects and in accordance with the purpose of the invention, the dual mounting assembly for a night vision system comprises a mounting frame having a first and a second receiving carriage each configured to receive and secure a mounting plate affixed to a surface of the night vision system. The carriages are each selectively adjustable to vary the distance between the operator and the eyepiece of the night vision system. The mounting frame is secured either to the visor of a standard ballistic helmet, as commonly used by the United States Armed Forces, or to a face mask which can be worn by an operator.

In an alternative embodiment of the present invention, the dual mounting assembly for a night vision system further comprises first and second receiving carriages which are selectively adjustable to compensate for the specific interpupillary distance of the operator's eyes. Additionally, the carriages are further adjustable to compensate for the specific elevation of the operator's eyes.

In accordance with another aspect of the invention, the night vision system is provided with a pair of mounting plates, each capable of being engaged by a selective one of the carriages. In this embodiment, the night vision system is a monocular. The monocular can either be mounted by engagement between a first mounting plate and a first receiving carriage for use by a first one of the operator's eyes, or by engagement of the second mounting plate with the second receiving carriage for use by a second one of the operator's eyes. Alternatively, the night vision monocular can be secured to either the first or second receiving carriage in a non-operational position, such that the monocular does not obstruct either of the operator's eyes. The operator can also use a pair of night vision monoculars, each of which are secured to individual ones of the receiving carriages. This dual usage enables night vision monoculars to simulate binocular usage.

In yet another embodiment of the present invention which relates directly to the parent application disclosed above, a night vision system is provided which comprises an optical portion for receiving and intensifying an image, and a mechanism for mounting the optical portion in either of two fixed positions relative one of an operator's eyes. In the first fixed position, the optical portion is disposed relative the operator's eye such that the operator can see the image when viewing through the optical portion. In the second fixed position, the optical portion is disposed laterally adjacent the eye so that the eye is unobstructed. The mounting mechanism permits the optical portion to be rapidly switched between the two fixed positions.

A more complete understanding of the dual mounting assembly for a night vision system of the present invention will be afforded to those skilled in the art, as well as a realization of additional advantages and objects thereof, by a consideration of the following detailed description of the preferred embodiment. Reference will be made to the appended sheets of drawings which will be first described briefly.

BRIEF DESCRIPTION OF THE DRAWINGS

FIG. 8 is a front view of an alternative embodiment of a dual mounting assembly for a night vision monocular system affixed to a face mask, permitting adjustment for IPD and elevation.

FIG. 10 is a cut-away view of an internal portion of the alternative mounting assembly of FIG. 8, taken through the section 10—10 of FIG. 9.

FIG. 11 is a cut-away view of another internal portion of the alternative mounting assembly of FIG. 8, taken through the section 11—11 of FIG. 9.

DESCRIPTION OF THE PREFERRED EMBODIMENTS

Figure 1:
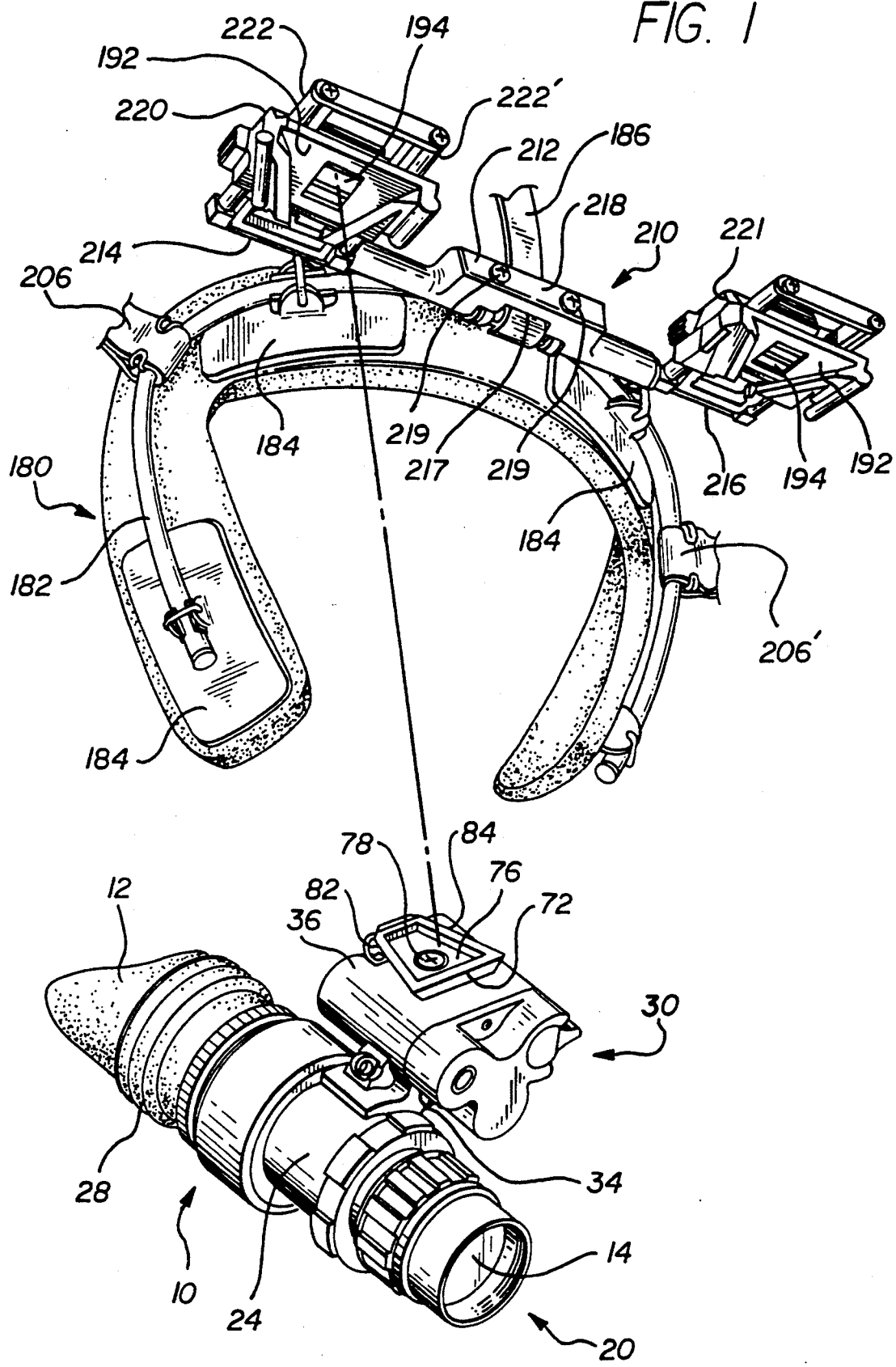
FIG. 1 is a perspective view of a dual mounting assembly for a night vision monocular system affixed to a face mask.

Law enforcement and military forces operating during conditions of near or total darkness have a critical need for lightweight, rugged night vision systems designed with human factors in mind. Referring first to FIG. 1, there is shown a night vision monocular 10. The monocular 10 has an optics portion, shown generally at 20, and a control housing, shown generally at 30. The control housing 30 contains the circuitry necessary for powering and controlling the optics portion 20.

The optics portion 20 is generally cylindrical in shape, and comprises an eyepiece 12, an objective lens 14 and an intermediate sleeve portion 24. The eyepiece 12 has a bellows 28 which is shaped to fit against the operator's face, providing a darkened shroud around the operator's eye. The bellows 28 is formed from a flexible material, which allows the eyepiece to be selectively manipulated so as to perfectly fit any particular operator. At the opposite end of the optics portion 20 from eyepiece 12, the objective lens 14 is provided.

The control housing 30 has an interconnection surface 34 which mates with the optics portion 20, a first mounting surface 36, and a second mounting surface 38. The first mounting surface 36 is clearly visible in FIG. 1. Although the second mounting surface 38 is hidden in that view, both mounting surfaces are shown in the front views of FIGS. 2 through 5. Each of the first mounting surface 36 and the second mounting surface 38 are substantially flat and provide an attachment point for mounting plates 72 and 74, respectively. As will be further described below, the use of the two mounting plates on control housing 30 enables the mounting of the monocular 10 in either a first position using mounting plate 72, or a second position using mounting plate 74. This enables a single monocular 10 to be used in either a left or a right eye configuration.

Each of the first mounting plate 72 and the second mounting plate 74 are identical, and are generally trapezoidal in shape. They each have a first edge 82 and a second edge 84 which converge in the direction of the eyepiece 12. The edges 82 and 84 are generally beveled so as to engage a carriage, which will be described below. An intermediate portion of mounting plate 72 has a depression 76, which provides an area for the mounting screw 78 and for securing by the carriage, as will be described below. The mounting screw 78 snugly secures the mounting plate 72 to the first mounting surface 36.

Figure 6:
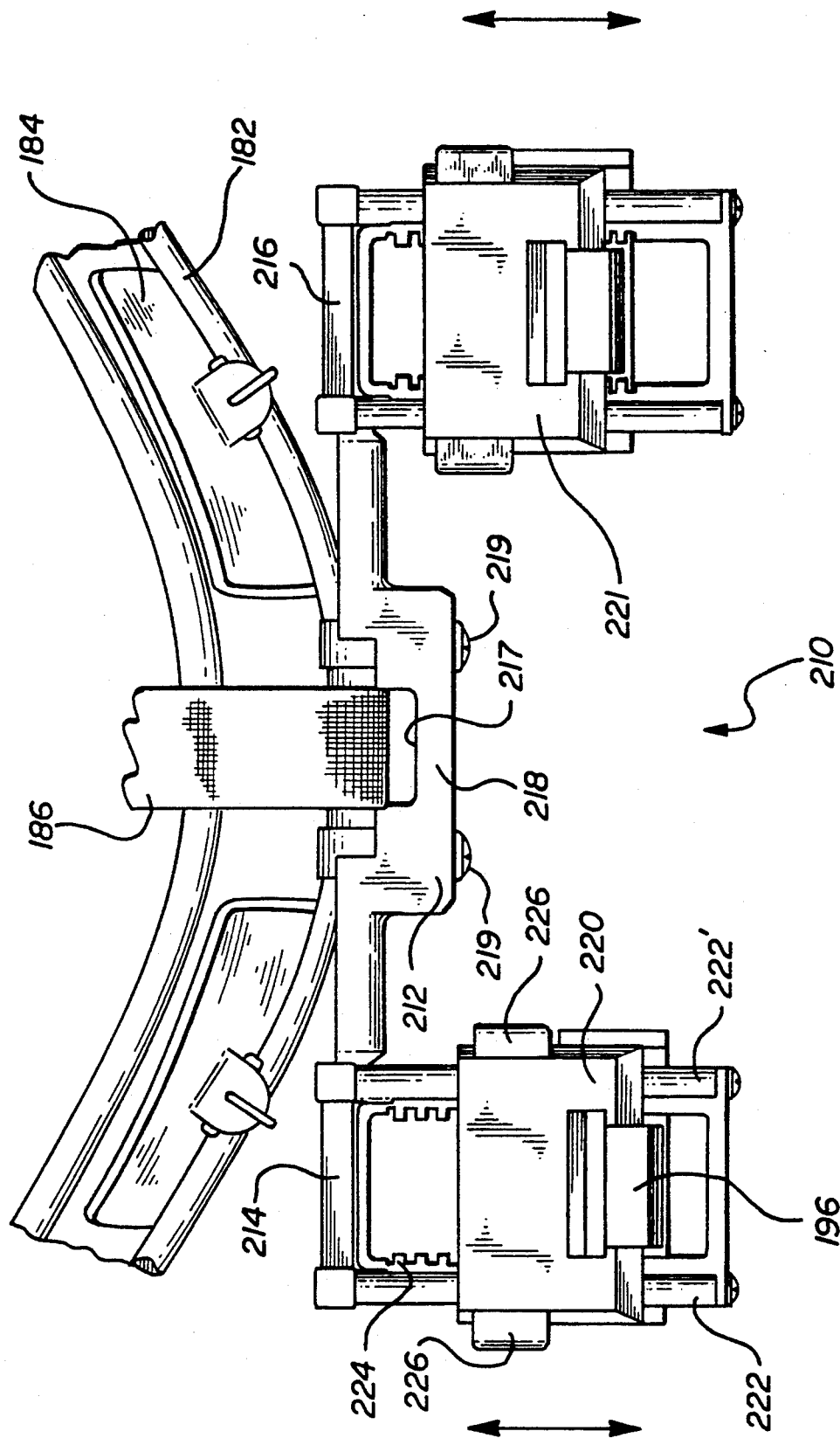
FIG. 6 shows the mounting assembly of FIG. 1 as viewed from the top of the assembly.

Referring still to FIG. 1 and also to FIG. 6, there is shown a dual mounting assembly 210 of the present invention. The mounting assembly 210 has a substantially straight support arm 212 having a first end 214 and a second end 216. The center of the support arm 212 has a raised portion 218 which receives a pair of mounting screws 219. Behind the raised portion 218 is a channel portion 217, which permits the use of a head strap 186, which will be further described below. The mounting screws 219 permit the support arm 212 to be secured to either a helmet mount, or a face mask mount, as will be further described below. The support arm 212 is made of a lightweight metallic material, such as aluminum, and is provided with a non-reflective black oxide coating.

At each of the first end 214 and the second end 216, a carriage assembly 220 and 221 is provided, respectively. The two carriage assemblies 220, 221 are identical, and the following description of assembly 220 is intended to apply to assembly 221 as well. Each of the mounting plates 72 and 74 are intended to be engaged by the carriage assemblies 220, 221. Carriage 220 has an engaging area 192 which is configured to receive one of the mounting plates 72, 74. The engaging area 192 has a shape identical to that of the mounting plates 72, 74, and the selected mounting plate can slidably engage the engaging area. A spring biased locking member 194 is provided to snap into the depression 78 and secure the mounting plates 72, 74 to carriage 220. Release button 196 retracts the locking member 194 against its bias to allow the mounting plates 72, 74 to be removed. The carriage 220 is carried by parallel guide bars 222 and 222'. The facing portions of the guide bars 222, 222' have a sawtooth track 224 which allows the carriage 220 to be incrementally positioned in the radial direction relative to the operator's face. Track control buttons 226 are provided on either side of the carriage 220 to enable the carriage to be freely manipulated along the guide bars 222, 222'. When the desired radial position is achieved, the operator will release track control buttons 226 to lock carriage 220 in the desired portion.

It is anticipated that the mounting assembly 210 be secured to either a face mask 180, or a helmet mount 110. The face mask 180 is shown in FIGS. 1 through 5, and comprises a frame 182 which partially surrounds the operator's face, and a plurality of mask plates 184 which pivot from the frame and press against specific point on the operator's face. The mask 100 is held to the operator's head by use of head strap 186, side straps 206 and 206' and chin strap 204. The face mask 180 has an attachment point at the center forehead portion which is adapted to receive the mounting screws 219 of the mounting assembly 210. The frame 182 is also made of a lightweight metallic material, such as aluminum, and is provided with a non-reflective surface.

Figure 7:
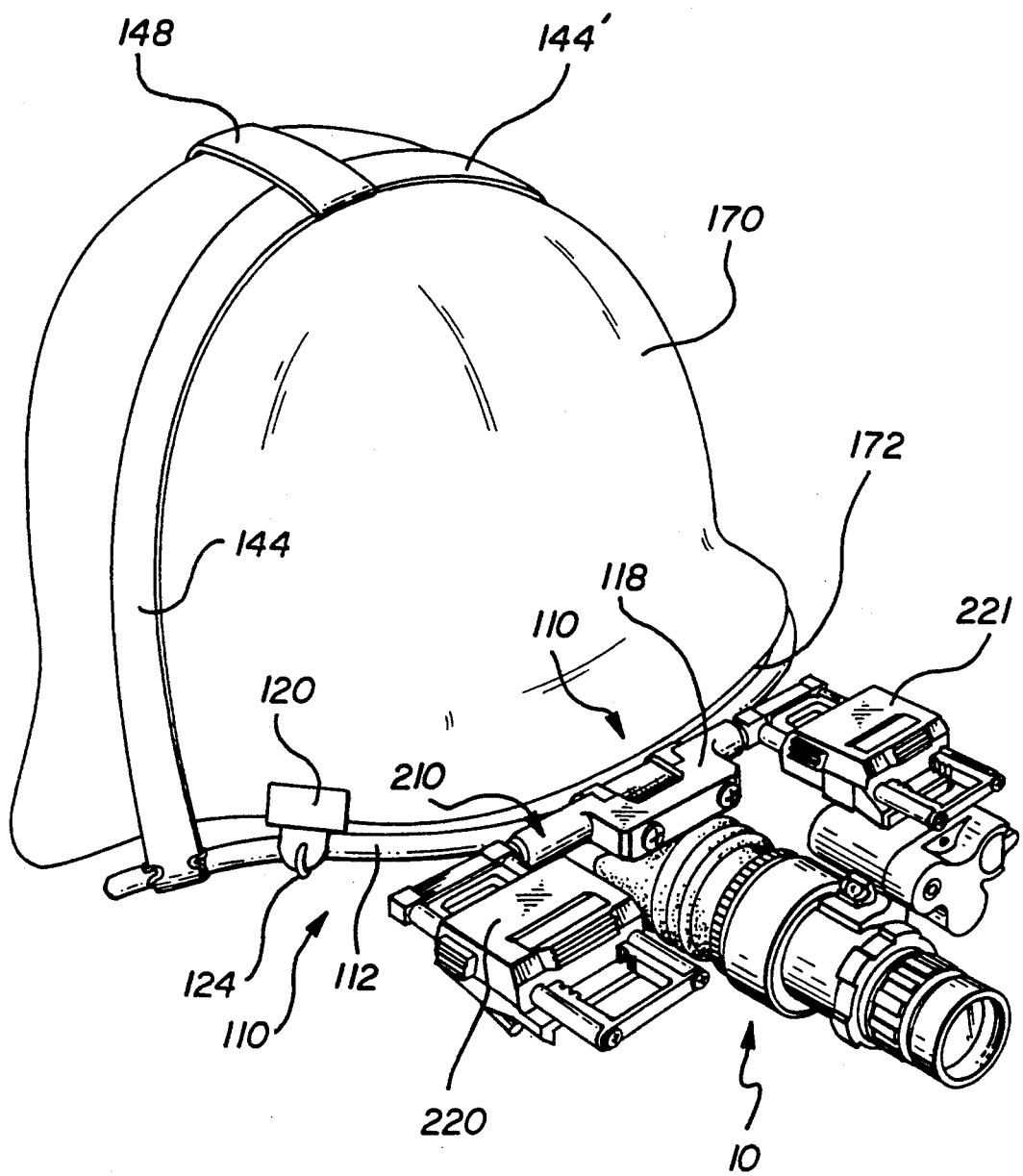
FIG. 7 is a perspective view of a mounting assembly for a night vision system in association with a helmet mounted configuration.

The helmet mount 110 is shown in FIG. 7, and comprises a generally C-shaped frame 112, having attachment points at the center portion to secure to the mounting assembly 220. The curvature of the frame 112 is intended to mimic that of the standard ballistic helmet 170 which is currently in use by United States Armed Forces. When mounted in place, frame 112 follows along a visor edge 172 of the helmet 170. The frame 112 comprises a substantially hollow tube which is bent into the desired shape by known machining methods. The frame 112 is also made of a lightweight metallic material, such as aluminum, and is provided with a non-reflective surface.

To hold the helmet mount 110 to the ballistic helmet 170, retainer cushion clamps 120, rear strap 148 and side straps 144 and 144' are provided. The cushion clamps 120 pivotally engage sleeve clamps 124 which frictionally attach onto frame 120. The sleeve clamps 124 can be slid along frame 112 to a desired spot. The cushion clamps 120 are generally U-shaped having an open portion adequate to engage the visor edge 172. The cushion clamps 120 firmly grip frame 112, yet can be moved to alternative positions quite easily if readjustment is necessary. The operator would typically space four retainer cushion clamps evenly along frame 112 to engage visor 172 of the helmet 170. Since the cushion clamps 120 are easily manipulable along frame 112, an operator can optimally position them to ensure that frame 112 is snug.

To further secure the helmet mount 110 to the helmet 170, side straps 144 and 144', engage frame 112 and extend upward along the surface of the helmet to a center joint position, where the side straps join with the rear strap 148. The rear strap 148 extends backward along the back of the helmet 170, and catches the rear edge of the helmet. It should be apparent that frame 112 would provide a stable platform for the installation of the monocular 10.

Figure 2:
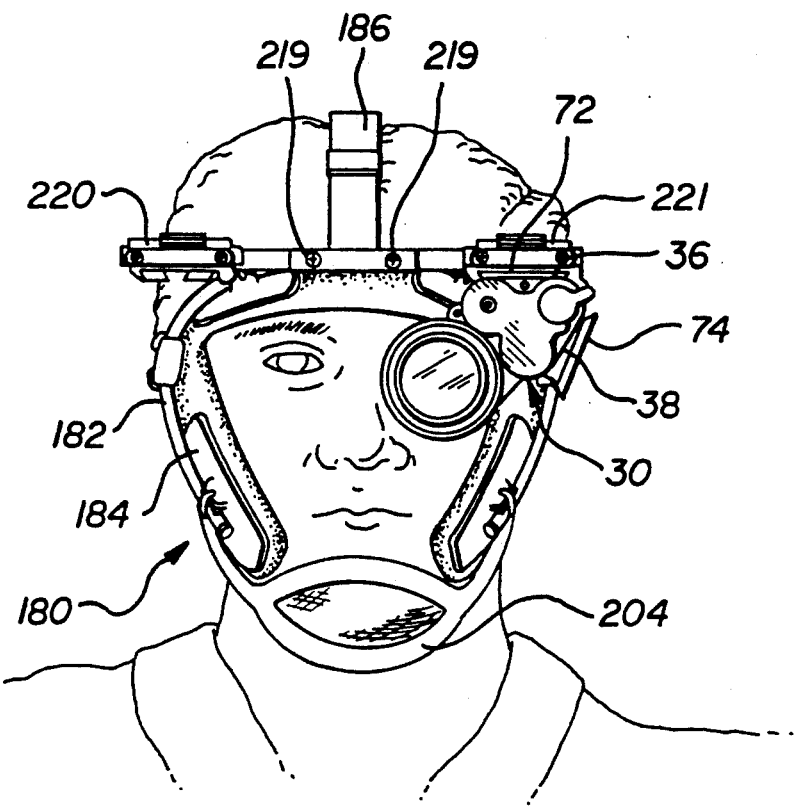
FIG. 2 shows the front of the dual mounting assembly of FIG. with a night vision monocular secured in position for left eye usage.
Figure 3:
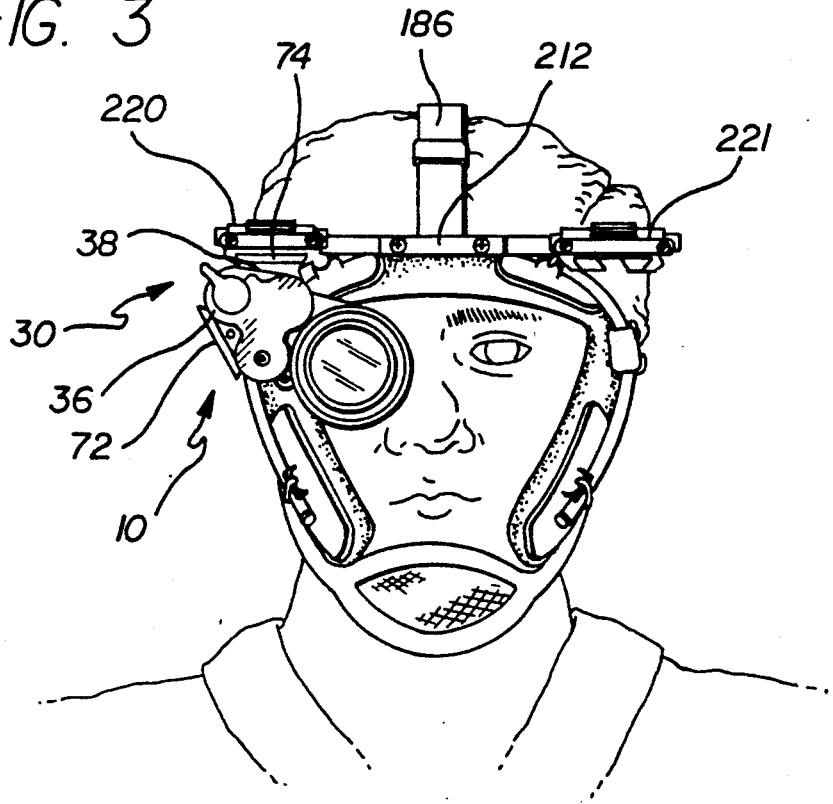
FIG. 3 is a front view of the dual mounting assembly of FIG. with a night vision monocular secured in position for right eye usage.

It should be apparent to those skilled in the art that the night vision monocular 10 can be mounted on the mounting assembly 210 in two operational and two non-operational positions. Each of the carriage assemblies 220, 221 can engage each of the first mounting plate 72 and the second mounting plate 74. As shown in FIG. 2, to use the monocular 10 with the operator's left eye, the first mounting plate 72 would engage the carriage assembly 221. Conversely, for the operator's right eye, the second mounting plate 74 would engage the carriage assembly 220, as shown in FIG. 3. In either configuration, the housing portion 30 would be positioned near the periphery of the operator's face. It should be apparent that this would leave ample space for the use of an external night vision system with the unaided eye.

Figure 5:
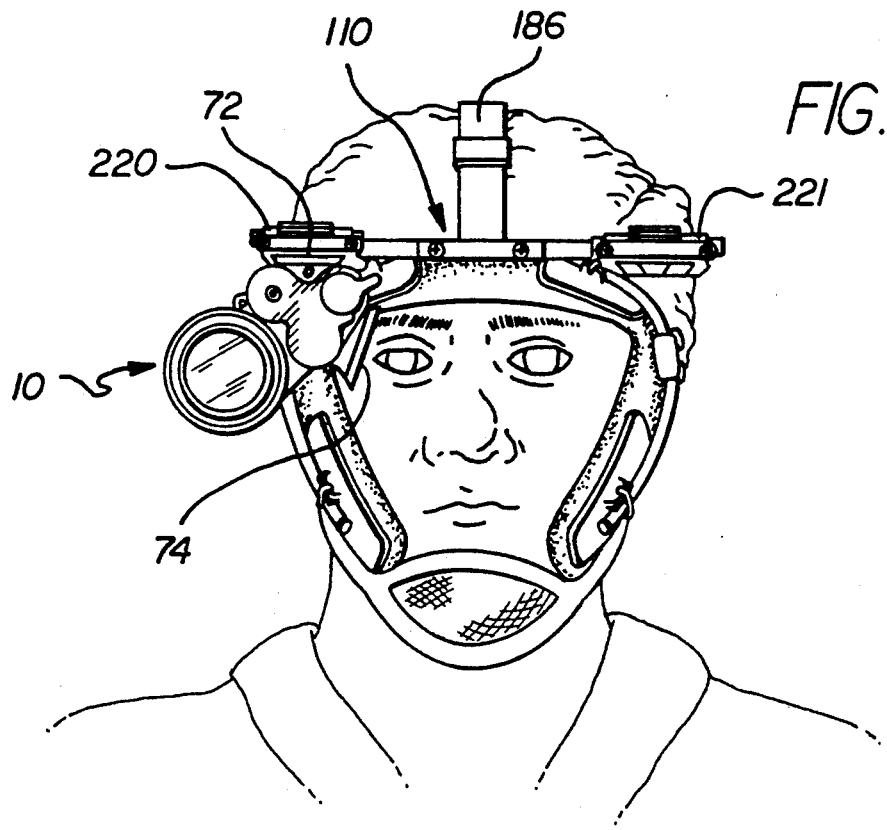
FIG. 5 is a front view of the mounting assembly of FIG. 1, with the night vision monocular secured in the non-operational position.

In the non-operational usage, the first mounting plate 72 would instead be engaged with the carriage assembly 220, or the second mounting plate 74 with the carriage assembly 221. This usage is shown in FIG. 5, with the night vision monocular 10 stowed to the right of the operator's right eye. In this configuration, the optical portion 20 would fall beyond the periphery of the operator's face leaving both eyes unobstructed. However, should the operator desire the night vision monocular 10 to be returned into usage, the operator can readily disengage the monocular 10 from the non-operational position and reengage it in either of the carriage assemblies 220, 221 for use with the desired eye.

Figure 4:
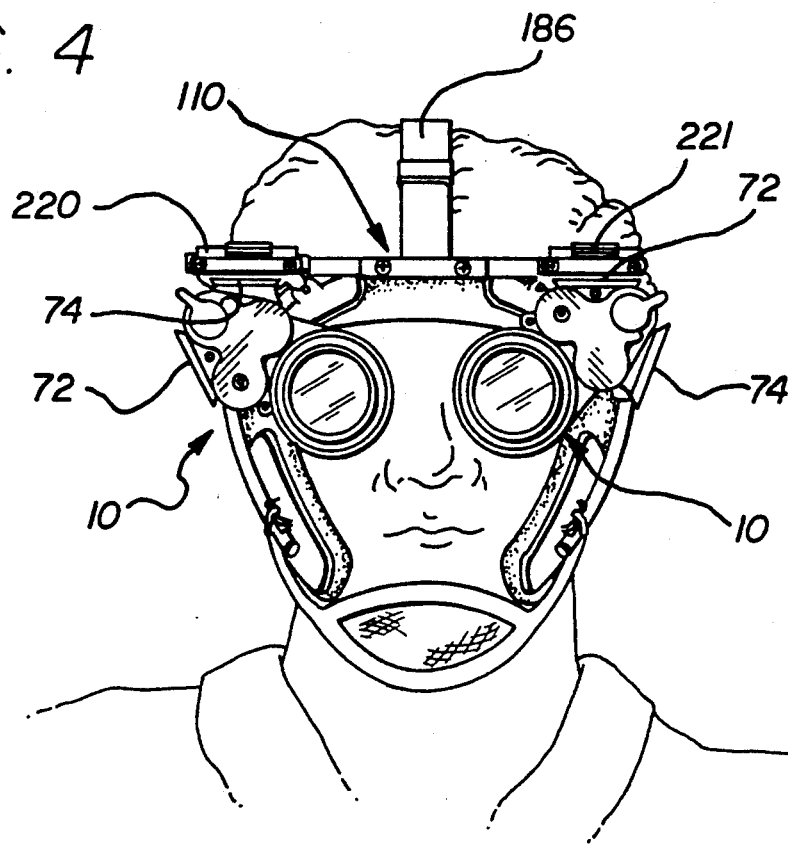
FIG. 4 is a front view of the mounting assembly of FIG. 1, with night vision monoculars secured in position for simultaneous left and right eye usage.

It should be further apparent that two night vision monoculars 10 can be simultaneously used, with a first mounting plate 72 of a first monocular 10 engaged with carriage assembly 221, and a second mounting plate 74 of a second night vision monocular 10 engaged with carriage assembly 220. This usage is shown in FIG. 4, and simulates the use of night vision binoculars.

Referring now to FIG. 8, there is shown an alternative embodiment of a mounting assembly 240 for a night vision system. Like the mounting assembly 210 described above, the alternative mounting assembly 240 has a center attachment point 242 which can be secured by screws to either a helmet mount, or a face mask mount as shown in FIG. 8. The center attachment point 242 is integrally formed to a back support brace 244 which is further secured to a housing 246. The housing 246 is generally rectangular and is enclosed at the top by an upper lid 248. In the preferred embodiment, the upper lid 248 is integrally formed with the back support brace 244 so as to improve its rigidity.

Suspended below the housing 246 are a pair of carriage supports 252 and 253. Each of the carriage supports 252, 253 are intricately formed with a lateral brace 254, 255 which extend outwardly relative the housing 246. Each of the lateral braces 254, 255 secure to respective ones of the carriages 220, 221. As substantially described above, the carriages 220, 221 are intended to secure to the mounting plates of the monocular 10. A knob 256 is provided on an end of the housing 246 which can be used by an operator to adjust the distance between the carriages 220, 221 so as to compensate for the interpupillary distance (IPD) of the operator. At an opposite end of the housing 246, an elevation lever 258 is provided. The elevation lever 258 enables the operator to adjust the elevation of each of the carriages 220, 221 to compensate for the line of sight of the particular operator's eyes.

Figure 9:
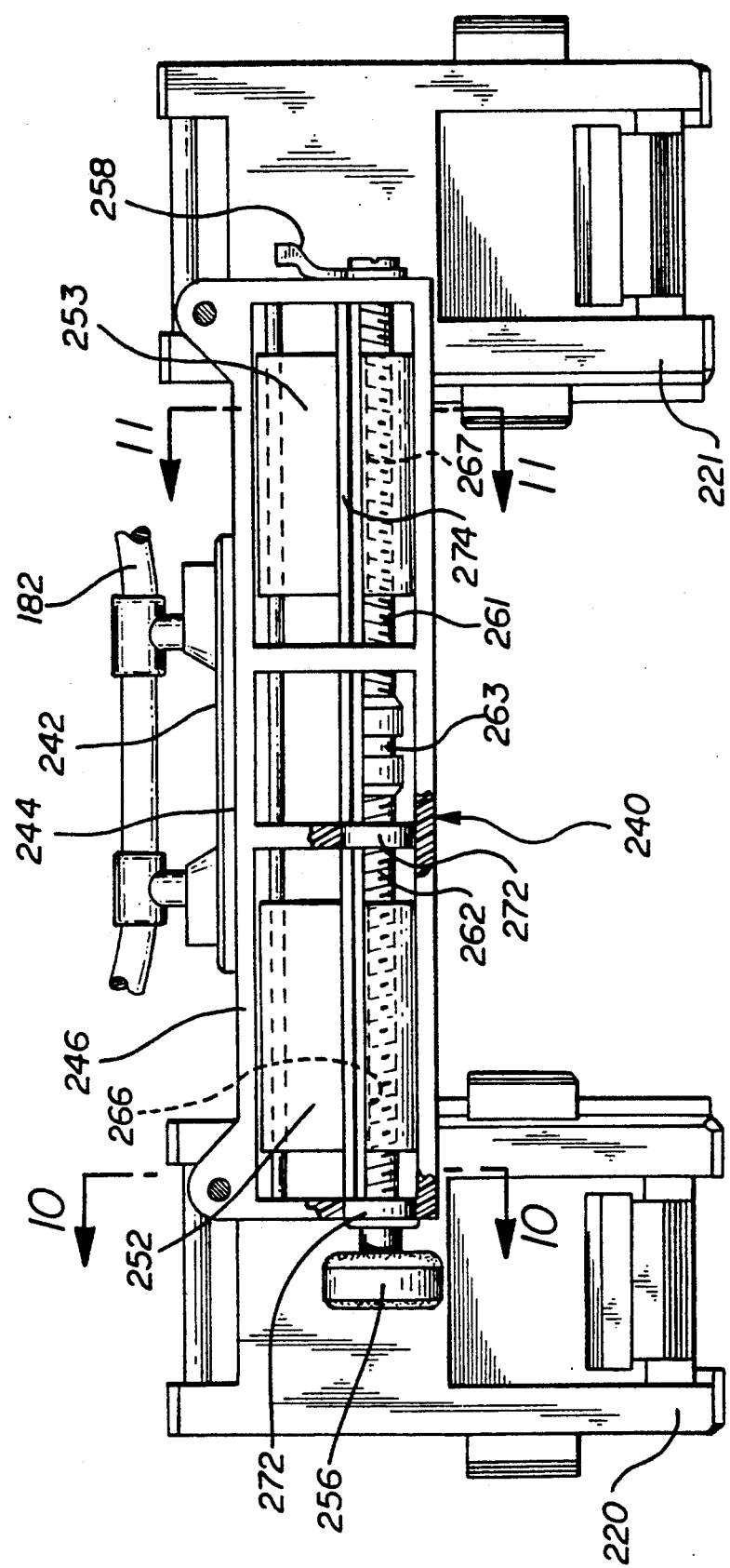
FIG. 9 is a partial cut-away top view of the alternative mounting assembly of FIG. 8, taken through the section 9—9 of FIG. 8.

Referring to FIGS. 9 through 11, there is shown the interior of the housing 246. Axially joined to the knob 256 is a rod having a first portion 261 and a second portion 262 combined by a center joint 263. Each of the rod portions 261, 262 are threaded, with each rod portion having threads which spiral in opposite directions. The threaded portions 261, 262 each engage the carriage supports 252, 253 at upper portions which are hidden from view in FIG. 8. Each of the carriage supports 252, 253 have internal threaded bores 266, 267 which threadingly engage the rod portions 261, 262, respectively. It should be apparent that a clockwise rotation of knob 256 would cause direct rotation of the rod portions 261, 262, further causing each of the carriage supports 252, 253 to move outward relative each other. Similarly, a counter clockwise rotation of the knob 256 would cause the carriage supports 252, 253 to move towards each other. It should be apparent that this inward or outward movement would enable a monocular 10 suspended from a selected one of the carriage 220, 221 to be adjusted to a precise location relative the operator's eyes.

As shown in the cut-away portion of FIG. 9 and in FIG. 10, a plurality of rotation members 272 are provided within the housing 246. The rotation members are generally cylindrical and rotate within formed cavities 278 of the housing 246. The threaded rod portions 261, 262 extend through the rotation member 272, however, they are offset within the members as best shown in FIG. 10. The elevation lever 258 mounts to an end of the threaded rod 261 and also joins to a elevation bar 274. The elevation bar 274 also passes through the rotation members 272. Each of the carriage supports 252, 253 have hook portions 265 which engage a pivot rod 268, as best shown in FIG. 11. Manipulation of the elevation lever 258 causes rotation of the rotation members 272 further causing the carriage supports 252, 253 to pivot about the pivot rod 268. This pivoting of the carriage supports 252, 253 results in a change of elevation of a night vision monocular 10 mounted to a selected one of the carriages 220, 221.

Having thus described a preferred embodiment of a mounting assembly for a night vision system, it should now be apparent to those skilled in the art that the aforestated objects and advantages for the within system have been achieved. It should also be appreciated by those skilled in the art that various modifications, adaptations, and alternative embodiments thereof may be made within the scope and spirit of the present invention.

For example, the present invention would not only be limited to a configuration featuring the mounting plates on the control housing and the carriage carried by the mounting assembly. Instead, the present invention is intended to comprise a configuration having the receiving carriage or carriages secured to the control housing, and the mounting plate provided on the mounting assembly. Also, it is anticipated that the mounting assembly be secured to other types of protective headgear, such as worn by pilots. The mounting assembly could also be operational when secured to equipment detached from the operator, such as to a weapon or weapon mounting platform. The carriages can also be used to secure other types of equipment besides night vision equipment, such as daylight scopes or face protecting screens.

The present invention is further defined by the following claims:

What is claimed is:

1. A night vision system, comprising:
   an optical portion;
   a control housing affixed to said optical portion having a first and a second mounting surface, a first mounting plate affixed to said first surface, and a second mounting plate affixed to said second surface;
   a mounting assembly having a first and a second carriage, each of said carriages being configured to receive a selected one of said mounting plates and means for securing said mounting plate within said carriage; and
   means for attaching said mounting assembly to an operator's head.

2. The night vision system of claim 1, wherein said mounting assembly comprises a support arm having a first end and a second end, said first carriage provided at said first end and said second carriage provided at said second end.

3. The night vision system of claim 2, wherein:
   each of said first end and said second end have a pair of parallel support bars extending outwardly relative the operator from the respective ends, each of said bar pairs having a sawtooth track disposed thereon;
   whereby, said carriages travel on said support bars and cooperate with said track to remain secured in a desired position.

4. The night vision system of claim 3, wherein said attaching means further comprises:
   a frame conforming in shape to a visor of a helmet worn by said operator, and carrying said mounting assembly in a central portion of said frame, said frame being secured to said helmet.

5. The night vision system of claim 3, wherein said attaching means further comprises:
   a frame partially surrounding the operator's face, a plurality of mask plates carried by said frame and pressing against specific points of the operator's face, and a strap affixed to said frame at a plurality of points, said frame carrying said mounting assembly in a central portion of said frame;
   whereby, said mask can be firmly affixed to the operator's head by intentional tightening of said strap.

6. In a night vision system having an optical portion and a control housing affixed to said optical portion, a mounting assembly comprising:
   a mounting plate affixed to a surface of said control housing;
   a support arm having a first and a second end, a first carriage provided at said first end, and a second carriage provided at said second end, and means for securing said mounting plate within a selected one of said carriages; and
   means for attaching said mounting assembly to an operator's head.

7. The mounting assembly of claim 6, wherein:
   each of said first end and said second end have a pair of parallel support bars extending outwardly relative the operator from the respective ends, each of said bar pairs having a sawtooth track disposed thereon;
   whereby, said carriages travel on said support bars and cooperate with said track to remain secured in a desired position.

8. The mounting assembly of claim 7, wherein said attaching means further comprises:
   a frame conforming in shape to a visor of a helmet worn by said operator, and carrying said mounting assembly in a central portion of said frame, said frame being secured to said helmet.

9. The mounting assembly of claim 7, wherein said attaching means further comprises:
   a frame partially surrounding the operator's face, a plurality of mask plates carried by said frame and pressing against specific points of the operator's face, and a strap affixed to said frame at a plurality of points, said frame carrying said mounting assembly in a central portion of said frame;
   whereby, said mask can be firmly affixed to the operator's head by intentional tightening of said strap.

10. The mounting assembly of claim 7, wherein said night vision system is a monocular, and said monocular can be secured to either said first carriage for use with a first one of the operator's eyes, or to said second carriage for use with a second one of the operator's eyes.

11. The mounting assembly of claim 10, wherein said monocular can be secured to either of said first carriage or said second carriage in a non-operational position in which both of the operator's eyes are unobstructed by said monocular.

12. The mounting assembly of claim 7, wherein said night vision system comprises a first and a second monocular, and said first monocular is secured to said first carriage for use with a first one of the operator's eyes while said second monocular is secured to said second carriage for use with a second one of the operator's eyes;

whereby, said first and second monoculars can be simultaneously utilized to simulate a binocular night vision system.

13. A night vision system, comprising:
an optical portion;
a control housing affixed to said optical portion having a first and a second mounting surface, a first mounting plate affixed to said first surface, and a second mounting plate affixed to said second surface;
a mounting assembly having a first and a second carriage, each of said carriages being configured to receive a selected one of said mounting plates and means for securing said mounting plate within said carriage;
means for attaching said mounting assembly to an operator's head; and
wherein said mounting assembly comprises a central housing having a manually rotatably rod, and a know axially connected to an end of said rod, said rod carrying said first carriage and said second carriage.

14. The night vision system of claim 13, wherein:
said rod further comprises a first threaded portion and a second threaded portion joined together at a center portion, each of said first threaded portion and said second threaded portion having threads which spiral in directions substantially opposite to each other;
said carriages further comprise a threaded bore, said threaded portions threadedly engaging said bores;
whereby, manual rotation of said rod in a first direction causes said carriages to move apart relative each other, and manual rotation of said rod in an opposite direction causes said carriages to move towards each other.

15. The night vision system of claim 14, further comprising:
a fixed pivot rod provided within said central housing, said carriages engaging said pivot rod and being pivotal about said pivot rod to alter elevation of said carriages.

16. The night vision system of claim 15, further comprising:
a lever arm provided externally of said central housing and mechanically linked to said carriages;
whereby, manipulation of said lever arm causes selectable adjustment of elevation of said carriages.

17. A selectively monocular or binocular mounting assembly for securing viewing equipment to an operator's head, comprising:
a mounting plate affixed to a surface of said viewing equipment;
a support arm having a first and a second receiving carriage each disposed above and offset laterally outwardly of a respective eye of the operator, and each of said first receiving carriage and said second receiving carriage including respective means for securing said mounting plate there within; and
means for attaching said mounting assembly to said operator'head.

18. The mounting assembly of claim 17, wherein said attaching means further comprises:
a frame conforming in shape to a visor of a helmet worn by said operator, said frame carrying said mounting assembly in a central portion of said frame, said frame being secured to said helmet.

19. The mounting assembly of claim 17, wherein said attaching means further comprises:
a frame partially surrounding the operator's face, a plurality of mask plates carried by said frame and pressing against specific points of the operator's face, and a strap affixed to said frame at a plurality of points, said frame carrying said mounting assembly in the central portion of said frame;
whereby, said mask can be firmly affixed to the operator's head by intentional tightening of said strap.

20. A mounting assembly for a night vision monocular having an optical portion and a control housing affixed to said optical portion, said mounting assembly comprising:
a first mounting plate affixed to a first surface of said control housing, and a second mounting plate affixed to a second surface of said control housing;
a support arm carrying a first and a second receiving carriage, and means for securing a selected one of said mounting plates within a selected one of said receiving carriages; and
means for attaching said mounting assembly to an operator's head.

21. The mounting assembly of claim 26, wherein said monocular can be secured to either said first receiving carriage for use with a first one of the operator's eyes, or to said second receiving carriage for use with a second one of the operator's eyes.

22. The mounting assembly of claim 21, wherein said monocular can be secured to either of said first receiving carriage or said second receiving carriage in a non-operational position in which both of the operator's eyes are unobstructed by said monocular.

23. The mounting assembly of claim 22, wherein said attaching means further comprises:
a face mask having a frame partially surrounding the operator's face and means for securing said face mask to said face, said frame carrying said mounting assembly in a central portion of said frame.

24. The mounting assembly of claim 22, wherein said attaching means further comprises:
a frame conforming in shape to a visor of a helmet, said frame being secured to said helmet and carrying said mounting assembly on a central portion thereof.

25. A night vision system, comprising:
an optical portion for receiving and intensifying an image; and
a means for mounting said optical portion in either of two fixed positions relative one of an operator's eyes and being rapidly switchable between said positions;
whereby, in said first position said optical portion is disposed relative said eye permitting said image to be viewed through said optical portion, and in said second position, said optical portion is disposed laterally adjacent said eye such that said eye is unobstructed.

26. The night vision system of claim 25, wherein said mounting means further comprises:
a mounting plate, a receiving carriage having an engaging portion configured to receive said mounting plate, and means for securing said mounting plate within said receiving carriage.

27. The night vision system of claim 26, wherein said mounting means is secured to a helmet.

28. The night vision system of claim 26, wherein said mounting means is secured to a face mask.

29. In a night vision system having an optical portion and a control housing affixed to said optical portion, a mounting assembly comprising:
- a mounting plate affixed to a surface of said control housing;
- a support arm having a first and a second end, a first carriage provided at said first end, and a second carriage provided at said second end, and means for securing said mounting plate within a selected one of said carriages;
- means for attaching said mounting assembly to an operator's head;
- wherein each of said first end and said second end has a pair of parallel support bars extending outwardly relative the operator from the respective ends, each of said bar pairs having a sawtooth track disposed thereon;
- whereby, said carriages travel on said support bars and cooperate with said track to remain secured in a desired position; and
- wherein said support arm is formed from a lightweight metallic material having a non-reflective surface.

* * * * *